United States Patent
Gmirya

(10) Patent No.: US 6,823,972 B2
(45) Date of Patent: Nov. 30, 2004

(54) SPRING CLUTCH

(75) Inventor: Yuriy Gmirya, Rego Park, NY (US)

(73) Assignee: Sikorsky Aircraft Corporation, Stratford, CT (US)

(*) Notice: Subject to any disclaimer, the term of this patent is extended or adjusted under 35 U.S.C. 154(b) by 0 days.

(21) Appl. No.: 10/364,944

(22) Filed: Feb. 12, 2003

(65) Prior Publication Data

US 2004/0154891 A1 Aug. 12, 2004

(51) Int. Cl.[7] .................. F16D 41/20; F16D 13/08; F16F 1/06
(52) U.S. Cl. .................... 192/41 S; 192/81 C; 267/155
(58) Field of Search ............................ 192/41 S, 81 C; 267/155

(56) References Cited

U.S. PATENT DOCUMENTS

| | | | | |
|---|---|---|---|---|
| 2,336,757 A | * | 12/1943 | Starkey ..................... | 192/41 S |
| 2,571,232 A | * | 10/1951 | Gorske ..................... | 192/41 S |
| 2,574,714 A | * | 11/1951 | Smith ......................... | 29/558 |
| 4,690,390 A | * | 9/1987 | Kish .......................... | 267/155 |
| 4,938,333 A | * | 7/1990 | Kish .......................... | 192/41 S |
| 5,749,449 A | * | 5/1998 | Kearney et al. .......... | 192/41 S |
| 5,799,931 A |   | 9/1998 | Kish | |

OTHER PUBLICATIONS

Helicopter Freewheel Unit Design Guide, Final Report, Oct. 1977, pp. 54–56, Sikorsky Aircraft, Stratford, CT.

* cited by examiner

Primary Examiner—Richard M. Lorence
(74) Attorney, Agent, or Firm—Bachman & LaPointe, P.C.

(57) ABSTRACT

A spring clutch has an arbor, a spring, and a sleeve. The spring at least partially surrounds the arbor and has a first portion coupled to the arbor to confine relative rotation of the first portion and arbor about an axis. The sleeve at least partially surrounds the spring and cooperates with the spring. The cooperation is sufficient so that an initial relative rotation between the arbor and sleeve in a first direction about the axis tends to uncoil the spring and bias the spring into firmer engagement with the sleeve. The cooperation is sufficient such that relative rotation in an opposite direction tends not to uncoil the spring and maintains the clutch in a disengaged condition.

23 Claims, 3 Drawing Sheets

SPRING CLUTCH

U.S. GOVERNMENT RIGHTS

The invention was made with U.S. Government support under contract DAAH10-01-2-0032 awarded by the U.S. Army. The U.S. Government has certain rights in the invention.

BACKGROUND OF THE INVENTION (1) Field of the Invention

This invention relates to power transmission, and more particularly to spring clutches.

(2) Description of the Related Art

Overrunning spring clutches are a well developed art. Such clutches make use of the principle that a spring coil will expand if twisted one way about its axis and contract if twisted the other way. In an exemplary clutch, respective portions of a coil spring are positioned within respective sleeves. In a neutral condition, of the spring portion within each sleeve, an end portion is lightly frictional engaged to the sleeve and a remaining portion is slightly radially spaced from the sleeve. When the sleeves rotate relative to each other about their common axis, friction between the sleeves and the associated end portions will tend to twist the spring. If the relative rotation is in the direction which would tend to contract the spring, there will be slippage or overrunning. If the relative rotation is in the opposite direction, the normal forces between the end portions and sleeve will increase and the heretofore spaced portions will expand into frictional engagement with the sleeves thereby resisting the relative rotation. Accordingly, when such a clutch is used to drive an output from an input rotating (absolutely) in a first direction, the clutch permits the output to rotate faster than the input in the first direction. This permits the output to continue to rotate if the input slows or is stopped. Absolute rotation of the input (or both the input and output) in an opposite second direction may be prevented by additional internal or external mechanisms.

U.S. Pat. No. 5,799,931 (the '931 patent) discloses an exemplary such spring clutch. In that patent, the spring is formed into a coil by a machining a helical slot in a tubular form (e.g., as distinguished from winding a wire or somehow casting without machining a slot).

BRIEF SUMMARY OF THE INVENTION

One aspect of the invention involves a clutch apparatus having an arbor, a spring, and a sleeve. The arbor has a first end, a second end, and an externally toothed portion. The spring at least partially surrounds the arbor and has an internally toothed portion intermeshed with the arbor externally toothed portion. The sleeve at least partially surrounds the spring and frictionally engages the spring. The engagement is sufficient so that an initial relative rotation between the arbor and sleeve in a first direction tends to uncoil the spring and bias the spring into firmer engagement with the sleeve. The engagement is sufficient that initial relative rotation between the arbor and sleeve in a second direction, opposite the first direction, tends not to uncoil the spring.

In various implementations, a pinion gear may be unitarily formed with the sleeve. The spring may have a slot between interior and exterior surfaces and extending between first and second axial ends and having a nonconstant helix angle. The slot may extend longitudinally at the first axial end and nearly circumferentially at the second axial end.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
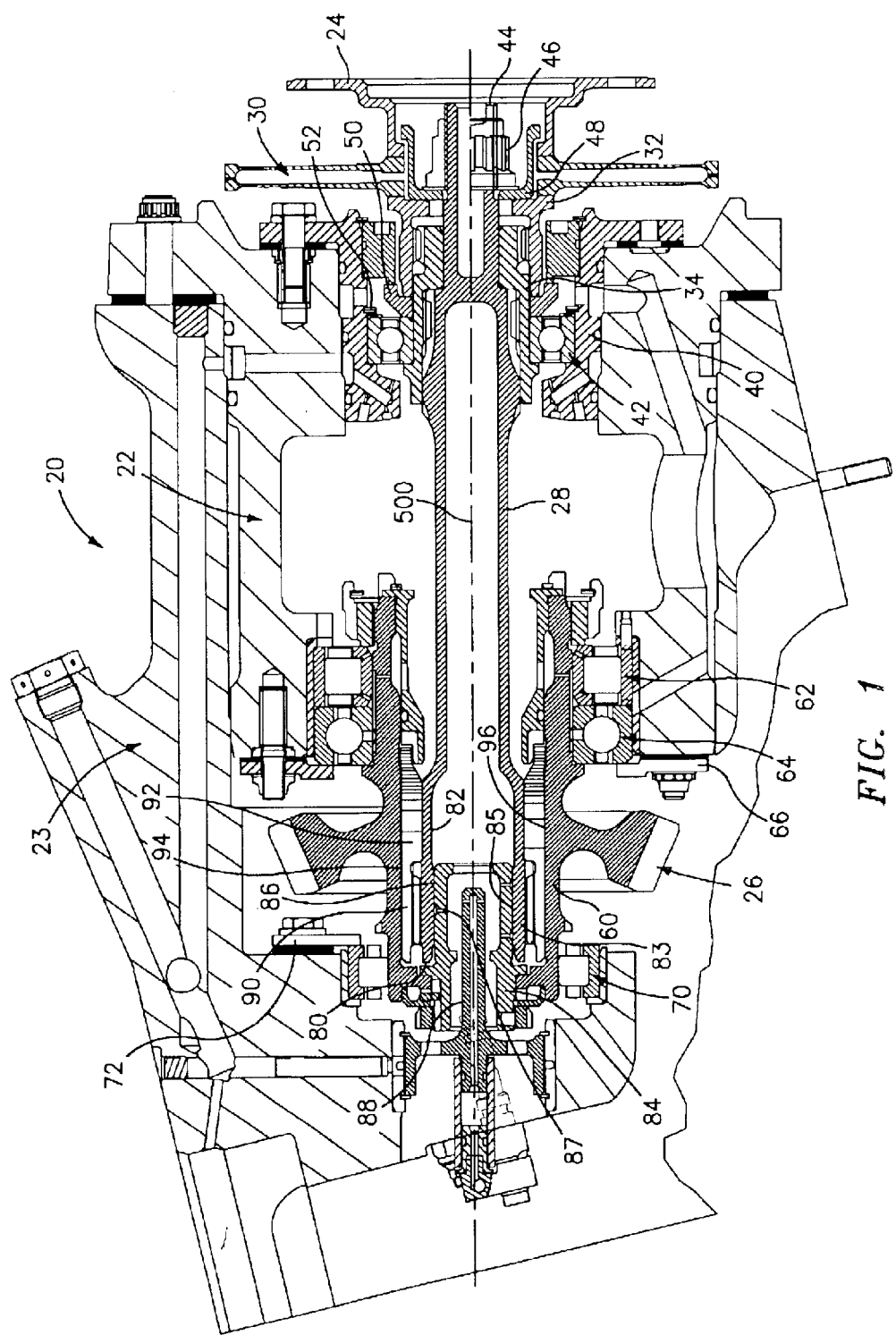
FIG. 1 is a longitudinal, partially sectional, view of a clutch according to principles of the invention.

FIG. 1 shows a spring clutch 20 having a housing 22 with a central longitudinal axis 500. The clutch input housing 22 is itself mounted within a main housing 23 (e.g., a main gearbox housing). The clutch receives a driving torque about the axis 500 from an external source (e.g., an engine (not shown)) through an input drive flange 24. The clutch may transmit a first sense or direction of such torque to an external load (e.g., a helicopter rotor system (not shown)) through an output pinion gear 26. The clutch advantageously does not transmit substantial torque of an opposite sense. Accordingly, input rotation in a first direction will be transmitted as output rotation, although the output pinion gear may rotate faster in that direction in an overrunning condition. Opposite input rotation (if permitted) will not be so transmitted to the output pinion gear.

In the illustrated embodiment, the input drive flange 24 drives an arbor shaft 28 via a diaphragm coupling 30. Specifically, the flange is secured to one end of the coupling while the other end is secured to an outer collar 32. The outer collar 32 surrounds and engages an upstream or input end portion of an inner collar 34 via interfitting teeth. The inner collar 34 surrounds a portion of the arbor shaft 28 and is similarly engaged thereto via interfittting teeth. At the upstream end, an outer bearing sleeve 40 is mounted within an opening in the housing 22. A ball bearing system 42 is radially positioned between the outer bearing sleeve 40 and the inner collar 34. Near an upstream end 44 of the arbor shaft, a nut 46 is threaded onto the shaft. The nut 46 bears against a spacer 48 which, in turn, bears against an upstream flange of the outer collar 32. A downstream rim of the outer collar 32 bears against a spacer 50 which, in turn, bears against the upstream rim of the inner race of the ball bearing system 42. The downstream rim of that race, in turn, bears against an upstream-facing external shoulder of the inner collar 34. A downstream-facing internal shoulder of the inner collar 34 bears against an upstream-facing external shoulder of the arbor shaft so that the foregoing series of components is compressively sandwiched between the nut and arbor shaft. The outer race of the ball bearing system 42 is captured between an upstream-facing internal shoulder of the outer bearing sleeve 40 and a retainer 52.

The exemplary pinion gear 26 extends radially outward from a sleeve 60 unitarily formed therewith. An upstream portion of the sleeve is rotatably mounted to the housing 22 via an upstream roller bearing system 62 and a ball bearing system 64 immediately downstream thereof. The bearing systems 62 and 64 are captured between a downstream-facing internal shoulder of the housing 22 and retainers 66 secured to the downstream rim of the housing 22.

A downstream portion of the sleeve 60 is clear of the housing 22 but rotatably mounted to the main housing 23 via a roller bearing system 70 captured between an upstream-facing internal shoulder of the main housing and retainers 72.

A portion of the arbor shaft 28 adjacent its downstream end 80 lies concentrically within the sleeve 60. In the exemplary embodiment, this includes a tubular section 82 of relatively enlarged internal and external diameter, but similar wall thickness to a main central portion of the arbor shaft. A downstream part 83 of the tubular section 82 surrounds an upstream portion of a sleeve bearing 84, a downstream portion of which is mounted to a downstream end of the sleeve 60. The interior surface 85 of the downstream part 83 and exterior surface 86 of the upstream part of the sleeve 84 are in sliding contact, lubricated through passageways 87 in the sleeve bearing upstream portion. The lubricant may be introduced through a jet 88 concentrically within the sleeve bearing and having lateral outlet ports. The exemplary embodiment of FIG. 1 shows numerous additional lubrication features which are not separately discussed.

The downstream part 83 of the section 82 is externally toothed while an upstream part is smooth. The externally toothed portion is enmeshed with an internally toothed proximal section 90 of a spring 92. The circumferential exterior surface 94 of the spring 92 is in close facing spaced or contacting proximity to an interior surface 96 of the sleeve 60 as is further described below.

Figure 2:
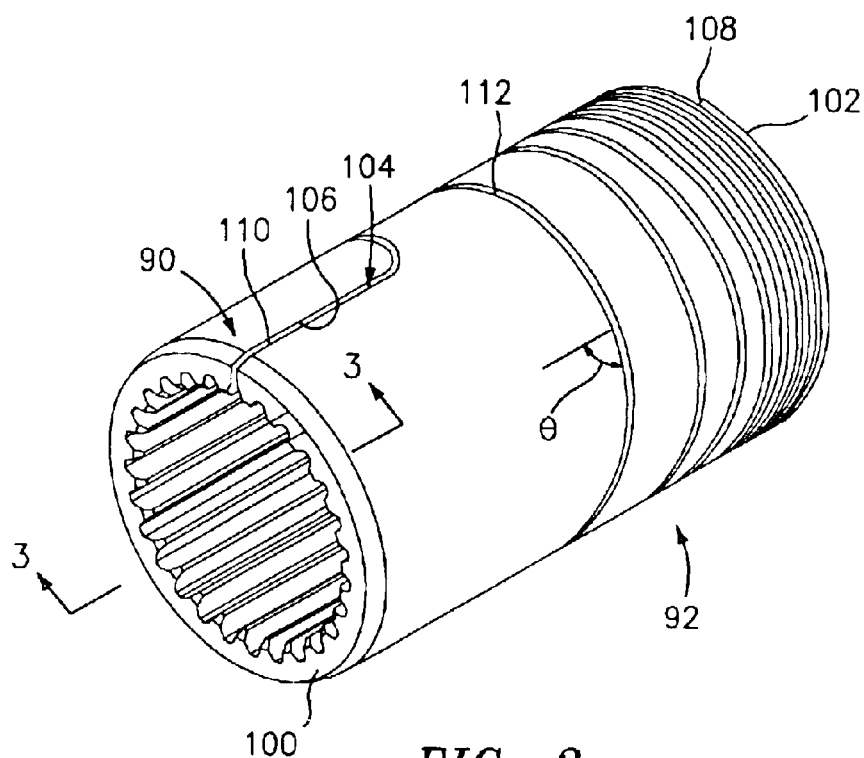
FIG. 2 is a view of a spring of the clutch of FIG. 1.
Figure 3:
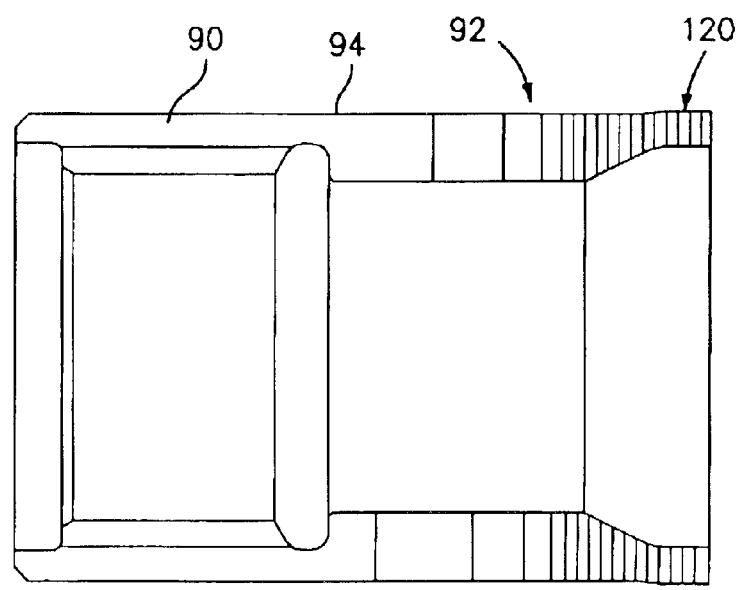
FIG. 3 is a longitudinal sectional view of the spring of FIG. 2, taken along line 3—3.

FIGS. 2 and 3 show further details of the spring 92. The spring extends from a proximal axial end 100 to a distal axial end 102. A slot 104 extends between these ends to form the spring as a coil having proximal and distal coil ends 106 and 108, respectively. The exemplary slot 104 has a nearly longitudinal portion 110 along the proximal section 90 transitioning to a helical portion 112. The helical portion has a helix angle θ which for purpose of reference is identified as the acute angle between the helix and the longitudinal direction. In the exemplary embodiment, the angle is nonconstant, progressively decreasing from the proximal section 90. At a distal portion of the spring, the rate of decrease may nearly cease or nearly cease so that the distal portion is of approximately constant helix angle. In the exemplary embodiment, in a relaxed condition the spring outer circumferential surface 94 is close to cylindrical, being essentially cylindrical along a major portion of its length and flaring out slightly at a tip or teaser portion 120. In a relaxed condition, the tip portion 120 is in frictional contact with the sleeve interior surface 96. The wall thickness of the spring is thinned along this distal portion for lightness of frictional engagement between the spring tip portion and sleeve. The spring may be manufactured by known techniques for or by techniques to be developed. The general form of the spring may tend to resemble half of a spring such as that identified in the '931 patent with the addition of the internally toothed proximal section.

When the arbor is initially rotated relative to the sleeve, there is frictional engagement between the tip portion 120 and the sleeve interior surface 96. If this initial rotation is in the direction wherein the friction would tend to contract the spring, the rotation may continue with substantial slippage between the tip portion 120 and sleeve interior surface 96. If this initial relative rotation is in the opposite, expanding, direction, the forces associated with expansion will increase the normal force between the tip portion 120 and the sleeve interior surface 96 and expand the heretofore noncontacting spaced-apart portions of the surface 94 into contacting frictional engagement with the surface 96. This enhanced friction resists further relative rotation.

Figure 4:
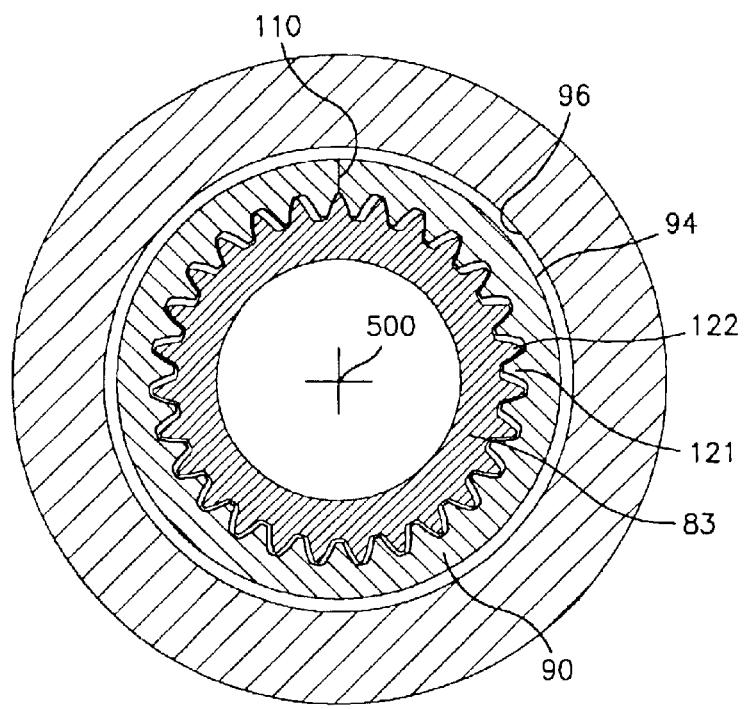
FIG. 4 is a transverse sectional view of an arbor shaft, spring, and sleeve of the clutch of FIG. 1 in a disengaged condition.
Figure 5:
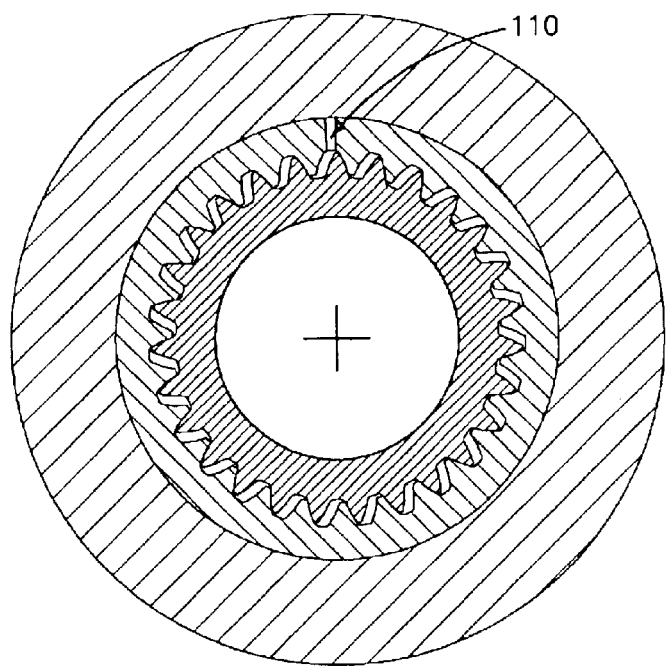
FIG. 5 is a transverse sectional view of an arbor shaft, spring, and sleeve of the clutch of FIG. 1 in an engaged condition.

The role of the spring and arbor shaft teeth is now addressed. FIG. 4 shows engagement of the teeth of the spring and arbor shaft in a disengaged neutral or overrunning condition. In this condition, the slot portion 110 is relatively closed and the spring exterior circumferential surface 94 is spaced apart from the sleeve interior surface 96. In this disengaged condition, the teeth are intermeshed but in generally non-contacting, non-load-bearing relation. For example, the resilience of the spring tending to close the gap 110 will bring the gap-facing surfaces of adjacent spring teeth into contact with the opposite faces of arbor shaft teeth. Moving circumferentially away from the gap, the two groups of teeth will tend to be non-contacting. The torque transmission associated with expansion of the spring in the engaged condition causes a camming interaction between the teeth 121 and 122 of the spring and arbor, expanding the slot 110 and radially expanding the spring surface 94 into engagement with the sleeve surface 96. In the exemplary embodiment, this expansion sequentially brings more pairs of spring and arbor teeth into engagement with each other. Advantageously, the teeth pitch and other dimensions (such as the initial radial gap between surfaces 94 and 96) are selected so that a maximally engaged condition is achieved when all arbor teeth are bearing against adjacent spring teeth (FIG. 5).

The expansion of the slot portion 110 advantageously reduces stress concentrations which would otherwise be present, for example, if the slot terminated at the section 90. Thus, although a more rigid nonmoving mounting between the spring and arbor is possible, it is advantageous that the mounting have sufficient play to permit the spring expansion along the section 90. Accordingly, in the exemplary embodiment the cooperation of the teeth constrains relative movement to a fraction of the tooth pitch appropriate to permit the expansion. In the exemplary embodiment, near the distal axial end 102 the spring's coil extends nearly circumferentially (e.g. typically well under 10° off circumferential). Near the proximal axial end 100 the slot extends longitudinally (e.g. well within 15° of longitudinal and effective to permit the slot expansion). If the teeth were helically or otherwise formed, the slot would/could be otherwise formed to match.

One or more embodiments of the present invention have been described. Nevertheless, it will be understood that various modifications may be made without departing from the spirit and scope of the invention. For example, in various embodiments or uses, the input may be through the sleeve rather than the arbor. Also, the invention may be applied to various spring and clutch configurations both known and yet developed. Details of any particular application (e.g., the environment in which the clutch is used) may influence the structure of such implementation. Accordingly, other embodiments are within the scope of the following claims.

What is claimed is:

1. A clutch apparatus comprising:
   an arbor having a first end and a second end and having an externally toothed portion;
   a spring, at least partially surrounding the arbor and having an internally toothed portion intermeshed with the arbor externally toothed portion; and a sleeve, at least partially surrounding the spring and frictionally engaging the spring so that:
  initial relative rotation between the arbor and sleeve in a first direction tends to uncoil the spring and bias the spring into firmer engagement with the sleeve and sequentially brings more pairs of spring teeth and arbor teeth into engagement with each other; and
  initial relative rotation between the arbor and sleeve in a second direction, opposite the first direction, tends not to uncoil the spring.

2. The clutch apparatus of claim 1 further comprising a pinion gear unitarily formed with the sleeve.

3. The clutch apparatus of claim 1 wherein the spring has:
  a first axial end and a second axial end, a first axial direction being defined from the first axial end toward the second axial end;
  interior and exterior surfaces;
  a slot between the interior and exterior surfaces extending from the first axial end to the second axial end and having a nonconstant helix angle.

4. The clutch apparatus of claim 3 wherein the slot extends within 150° of longitudinally at the first axial end and within 10° of circumferentially at the second end.

5. A spring clutch apparatus having engaged and disengaged conditions comprising:
  an arbor having a first end and a second end and an axis;
  a spring, at least partially surrounding the arbor and having a first portion coupled to the arbor to confine relative rotation of the first portion and arbor about the axis; and
  a sleeve, at least partially surrounding the spring and cooperating with the spring so that:
    initial relative rotation between the arbor and sleeve in a first direction about the axis tends to uncoil the spring and bias the spring into firmer engagement with the sleeve in the engaged condition with torque transmission causing a camming interaction between arbor teeth and spring teeth, expanding a slot in the spring; and
    initial relative rotation between the arbor and sleeve in a second direction, opposite the first direction, tends not to uncoil the spring and maintain the clutch apparatus in the disengaged condition.

6. The clutch apparatus of claim 5 further comprising a pinion gear unitarily formed with the sleeve.

7. A clutch spring comprising:
  a first axial end and a second axial end, a first direction being defined from the first axial end toward the second axial end;
  interior and exterior surfaces;
  a first axial end portion having a plurality of alternating at least partially longitudinal grooves and lands;
  a slot between the interior and exterior portions and having a nonconstant helix angle that, along at least a portion of the spring progressively varies and becomes more circumferential in the first direction,
wherein:
  the slot extends from the first end to the second end;
  along the first axial end portion, the spring has internal spring teeth for engaging external spring teeth of an arbor;
  the slot defines a gap along the first axial end portion;
  resilience of the spring tending to close the gap tends to bring gap-facing surfaces of adjacent ones of the spring teeth into contact with opposite faces of associated ones of the arbor teeth in a disengaged clutch condition and moving circumferentially away from the gap, the two spring and arbor teeth will become non-contacting; and
  torque transmission associated with expansion of the spring in an engaged clutch condition causes a camming interaction between the spring teeth and the arbor teeth, expanding the slot and sequentially bringing more pairs of said spring teeth and arbor teeth into engagement with each other.

8. The spring of claim 7 wherein a maximally engaged condition is achieved when all said arbor teeth are bearing against adjacent ones of said spring teeth.

9. The spring of claim 8 wherein the slot extends substantially longitudinally along the first axial end portion.

10. The spring of claim 8 wherein the slot is machined.

11. A clutch spring comprising:
  a first axial end and a second axial end, a first direction being defined from the first axial end toward the second axial end;
  interior and exterior surfaces;
  a first portion having interior teeth for engaging teeth of an arbor to transmit rotation from the arbor to the clutch spring; and
  a second portion having exterior means for engaging an output sleeve,
wherein:
  said rotation of the arbor in a first direction causes the exterior means to engage the sleeve to transmit said rotation to the sleeve in an engaged condition; and
  said rotation of the arbor in a second direction, opposite the first direction, causes the exterior means to relatively disengage the sleeve to permit relative rotation of the sleeve and arbor in an overrunning condition; and
  transition to the engaged condition sequentially brings more pairs of said spring teeth and said arbor teeth into engagement with each other.

12. The clutch spring of claim 11 wherein:
  in the overrunning condition, the arbor teeth and spring teeth are intermeshed but in generally non-contacting, non-load bearing relation.

13. The clutch spring of claim 11 wherein:
  the spring has a slot defining a gap adjacent a pair of said spring teeth; and
  in the overrunning condition resilience of the spring will bring gap-facing surfaces of said pair of said spring teeth into contact with the opposite faces of associated arbor shaft teeth.

14. The clutch spring of claim 12 wherein:
  the spring has a slot defining a gap along the first portion; and
  a camming interaction between the spring teeth and arbor teeth expands the slot.

15. The clutch spring of claim 11 wherein:
  the arbor teeth and spring teeth have pitch dimensions effective to provide a maximally engaged condition when all said arbor teeth are bearing against adjacent ones of said spring teeth.

16. A clutch apparatus comprising:
  an arbor having a first end and a second end and having an externally toothed portion proximate the second end;
  a spring, at least partially surrounding the arbor and having an internally toothed portion intermeshed with the arbor externally toothed portion;
  a sleeve, at least partially surrounding the spring and frictionally engaging the spring so that:

initial relative rotation between the arbor and sleeve in a first direction tends to uncoil the spring and bias the spring into firmer engagement with the sleeve; and initial relative rotation between the arbor and sleeve in a second direction, opposite the first direction, tends not to uncoil the spring; and a sleeve bearing concentrically within the arbor proximate the arbor second end and having an external surface in lubricated engagement with an internal surface of the arbor.

17. The clutch apparatus of claim 16 further comprising a pinion gear unitarily formed with the sleeve.

18. The clutch apparatus of claim 16 wherein the first end is an input end and the second end is an output end.

19. The clutch apparatus of claim 16 wherein:

the first end is an input end and the second end is an output end with a downstream direction defined from the first end toward the second end; and the arbor externally toothed portion is formed proximate a downstream end of a tubular section having enlarged external and internal diameters relative to a central section upstream thereof.

20. The clutch apparatus of claim 19 wherein:

an external surface of an upstream portion of the tubular section contacts an internal surface of the spring.

21. A clutch apparatus comprising:

an arbor having a first end and a second end and having an externally toothed portion proximate the second end;

a spring, at least partially surrounding the arbor and having:

a proximal internally toothed portion intermeshed with the arbor externally toothed portion; and a distal helical portion extending toward the arbor first end; and a sleeve, at least partially surrounding the spring and frictionally engaging the spring so that:

initial relative rotation between the arbor and sleeve in a first direction tends to uncoil the spring and bias the spring into firmer engagement with the sleeve; and initial relative rotation between the arbor and sleeve in a second direction, opposite the first direction, tends not to uncoil the spring.

22. The clutch apparatus of claim 21 further comprising:

a housing;

a pinion gear unitarily formed with the sleeve; and at least one bearing system rotatably mounting the sleeve to the housing.

23. The clutch apparatus of claim 21 further comprising:

a housing;

a pinion gear unitarily formed with the sleeve; and a first bearing system rotatably mounting the sleeve to the housing on a first end side of the pinion gear; and a second bearing system rotatably mounting the sleeve to the housing on a second end side of the pinion gear.

* * * * *

UNITED STATES PATENT AND TRADEMARK OFFICE
CERTIFICATE OF CORRECTION

PATENT NO. : 6,823,972 B2
DATED : November 30, 2004
INVENTOR(S) : Yuriy Gmirya

It is certified that error appears in the above-identified patent and that said Letters Patent is hereby corrected as shown below:

Column 5,
Line 23, "150°" should read -- 15° --.

Column 6,
Line 49, "claim 12" should read -- claim 11 --.

Signed and Sealed this

Twelfth Day of April, 2005

JON W. DUDAS
*Director of the United States Patent and Trademark Office*